O. H. BEUTLER.
PISTON.
APPLICATION FILED JULY 15, 1920.

1,371,217.  Patented Mar. 15, 1921.

Oswald H. Beutler
INVENTOR.

BY George J. Oltsch
ATTORNEY.

UNITED STATES PATENT OFFICE.

OSWALD H. BEUTLER, OF SOUTH BEND, INDIANA.

PISTON.

1,371,217.   Specification of Letters Patent.   Patented Mar. 15, 1921.

Application filed July 15, 1920. Serial No. 396,506.

*To all whom it may concern:*

Be it known that I, OSWALD H. BEUTLER, a citizen of the United States, residing at South Bend, in the county of St. Joseph and State of Indiana, have invented certain new and useful Improvements in Pistons, of which the following is a specification.

The invention relates to pistons and has for its object to provide a piston, of the expansible type particularly adapted for use in connection with internal combustion engines and so constructed that the use of piston rings may be obviated.

A further object is to provide a piston consisting of two cylindrical members telescopically engaged, each cylindrical member being split at substantially opposite points, which sections when subjected to heat will expand and snugly fit the bore of the cylinder, said splits being of such a width that upon expansion the outer cylindrical member will not seize the cylinder, as the force of expansion can yield to the resistance offered by the cylinder.

A further object is to provide a detachable piston head, which piston head is held in engagement with the upper ends of the cylindrical members by means of a bolt. The engaging surfaces of the piston head and the cylindrical members are inclined, thereby allowing expansion of the cylindrical members radially and expansion of the piston head.

A further object is to provide the inner cylindrical member with a web provided with a centrally disposed aperture for the reception of the piston head bolt, and to provide the web with a radially disposed split in communication with the bolt aperture, thereby providing a securing web which will allow radial expansion of the inner cylindrical member.

A further object is to provide a vertically disposed substantially I-shaped key member, which member has one of its flanged ends disposed in the split of the outer cylindrical member and provided with lugs engaging recesses in adjacent edges of the outer cylindrical member for forming a packing and preventing loss of compression, the other flanged end of the I-shaped key member being disposed in a vertical channel of the inner cylindrical member, which channel is of sufficient size to allow movement radially when the outer cylindrical member expands.

A further object is to provide the inner cylindrical member with diametrically disposed inwardly tapered wrist pins for the reception of a connecting rod, which connecting rod is also split so as to allow for expansion.

With the above and other objects in view the invention resides in the combination and arrangement of parts, as hereinafter set forth, shown in the drawings, described and claimed, it being understood that changes in the precise embodiment of the invention may be made within the scope of what is claimed without departing from the spirit of the invention.

In the drawings:—

Figure 1:
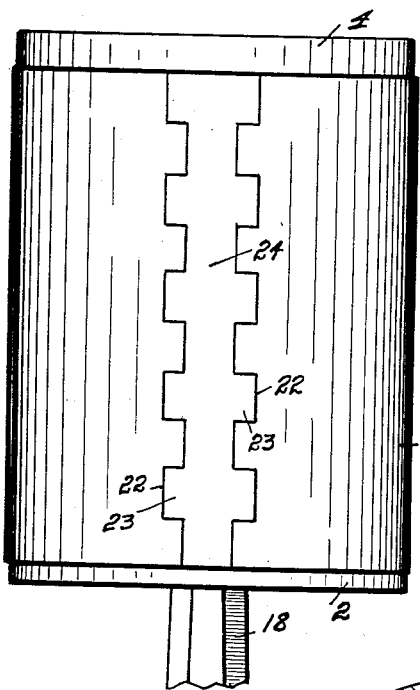
Figure 1 is a side elevation of the piston.
Figure 2:
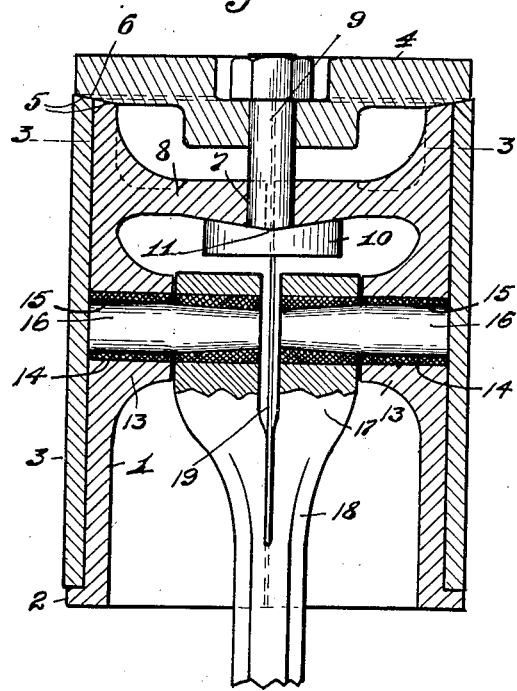
Fig. 2 is a vertical sectional view through the piston.
Figure 3:
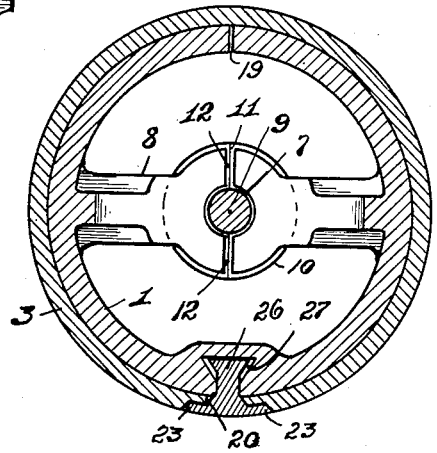
Fig. 3 is a horizontal sectional view taken on line 3—3 of Fig. 2.
Figure 4:
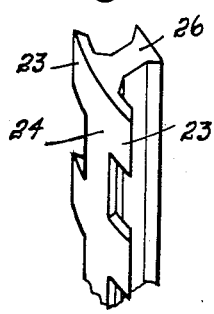
Fig. 4 is a detail perspective view of a portion of the I-shaped key member.

Referring to the drawing, the numeral 1 designates the cylindrical inner member, which member adjacent its lower end is provided with an annular flange 2, on which flange the outer cylindrical member 3 rests and is held by means of the piston head 4. The upper ends of the cylindrical members 1 and 3 are inwardly beveled, as at 5, with which beveled ends the bevel surface 6 of the piston head 4 engages. Extending through the piston head 4, and through an aperture 7, in the web 8 of the inner cylindrical member 1 is a securing bolt 9, which bolt holds the inner and outer cylindrical members in engagement with each other and against displacement. As the cylindrical members 1 and 3 expand incident to heat simultaneously with the expansion of the piston head 4, it will be seen that the bevel engaging surfaces of the cylindrical members and the piston head will allow the cylindrical members to expand. The head 10 of the bolt 9 is transversely recessed as at 11 so as to prevent circumferential creeping incident to alternate expansion and contraction of the metal. Web 8 at a substantially central point thereof is provided with splits 12, which splits are in communication with the bolt aperture 7 and provide means whereby the web will not interfere with the expansion of the inner cylindrical member 1 when the same is subjected to heat, however during this expansive action, it will be seen that the web ends adjacent the bolt 9 will ride up the inclined surfaces of the bolt head 10, thereby additionally maintaining a tight joint between the piston head 4 and the upper ends of the cylindrical members 1 and 3.

Cylindrical member 1 on its inner periphery is provided with diametrically disposed wrist pin bosses 13, in apertures 14 of which are disposed bearing bushings 15, which bushings have disposed therein diametrically and axially alined wrist pins 16. Wrist pins 16 taper inwardly toward each other and have their ends spaced apart so as to allow expansion and contraction of the cylindrical members. Bearing bushings 15 have pivoted thereon the split head 17 of a connecting rod 18, which split head also allows free expansion and contraction of the inner cylindrical member, and also the outer cylindrical member. It will be seen that the parts are so connected that expansion of the metal will be allowed so as to maintain the compression within the cylinder and that the connections are positive.

The inner cylindrical member 1 is split at 19 at a diametrically disposed point to the split 20 of the outer cylindrical member. The edges of the split 20 are provided with recesses 22 for the reception of the lugs 23 of an I-shaped key member 24, said I-shaped key member is provided with an enlarged dove-tailed side 26 which is disposed in a vertical groove 27 of an enlarged portion of the inner cylindrical member, said groove 27 being slightly larger than the enlarged side 26 of the I-shaped member 24 so that as the outer cylindrical member expands, the I-shaped member will not prevent or interfere with the expansion. By providing the lugs 23, which engage recesses 22, it will be seen that the lugs will prevent loss of expansion and act in a manner similar to the overlapped ends of a conventional form of piston ring.

The views in the drawing show the parts in normal relation, and as the limits of expansion of the sleeves in no case will be very great, the allowance to permit relative adjustment of the parts under influence of heat would not be great.

From the above it will be seen that a piston is provided, which piston is so constructed that the use of piston rings is eliminated. It will also be seen that the parts have been so designed that the piston may be easily and quickly assembled.

The invention having been set forth what is claimed as new and useful is:—

1. A piston comprising inner and outer engaged cylindrical members, said cylindrical members being split at substantially opposite points, a piston head secured to said cylindrical members, a channel in the inner cylindrical member adjacent the split of the outer cylindrical member and a dove tailed key in said split of the outer cylindrical member and the channel of the inner cylindrical member.

2. The combination with telescopically engaged cylindrical members of a piston having a piston head secured thereto, of splits in said cylindrical members, a dove-tailed member disposed in the split of the outer member telescopically engaged member, said dove-tailed member having its inner side disposed in a channel of the inner cylindrical member.

3. A piston comprising inner and outer cylindrical members provided with substantially oppositely disposed splits, a dove-tailed member substantially I-shaped in cross section disposed in the split of the outer cylindrical member and having its inner side disposed in a channel of the inner cylindrical member, said channel being slightly larger than the inner side of the I-shaped member.

4. A piston comprising inner and outer cylindrical members provided with a detachable piston head and diametrically disposed splits, a key member for said cylindrical members, said key member being substantially I-shaped in cross section and disposed in the slit of the outer cylindrical member, the I-shaped member having its inner side disposed in an enlarged channel of the inner cylindrical member, and lugs carried by the I-shaped member at its outer end for engaging recesses in the outer cylindrical member adjacent its split.

5. A piston comprising inner and outer cylindrical members provided with substantially oppositely disposed slits, a web carried by the inner cylindrical member, said web being split transversely, a piston head secured to said web and to the piston, by means of a bolt, beveled engaging surfaces between the piston head and the inner and outer cylindrical members, spaced inwardly tapered wrist pins carried by the inner cylindrical member for the reception of a split connecting rod head, and a dove-tailed key member disposed in the split of the outer cylindrical member and an enlarged channel of the inner cylindrical member, said key member providing means for maintaining the cylindrical members in their relative position and preventing loss of compression in a cylinder.

In testimony whereof I affix my signature.

OSWALD H. BEUTLER.